United States Patent
Mericle et al.

(10) Patent No.: US 9,160,791 B2
(45) Date of Patent: Oct. 13, 2015

(54) MANAGING CONNECTION FAILOVER IN A LOAD BALANCER

(71) Applicant: International Business Machines Corporation, Armonk, NY (US)

(72) Inventors: Grant S. Mericle, Durham, NC (US); Srinivasan Muralidharan, Apex, NC (US); Harley A. Stenzel, Hillsborough, NC (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 13/965,759

(22) Filed: Aug. 13, 2013

(65) Prior Publication Data

US 2015/0052249 A1    Feb. 19, 2015

(51) Int. Cl.
| | |
|---|---|
| G06F 15/173 | (2006.01) |
| H04L 29/08 | (2006.01) |
| H04L 27/00 | (2006.01) |
| H04L 1/00 | (2006.01) |
| H04L 12/24 | (2006.01) |
| H04L 12/26 | (2006.01) |

(52) U.S. Cl.
CPC ...... *H04L 67/1004* (2013.01); *H04L 29/08144* (2013.01); *H04L 1/0078* (2013.01); *H04L 12/2483* (2013.01); *H04L 12/2602* (2013.01); *H04L 27/00* (2013.01); *H04L 41/0806* (2013.01)

(58) Field of Classification Search
CPC ... H04L 1/0078; H04L 27/00; H04L 12/2483; H04L 29/08144; H04L 12/2602; H04L 41/0806
USPC .......................... 709/217, 220, 223, 230, 238
See application file for complete search history.

(56) References Cited

U.S. PATENT DOCUMENTS

| | | | |
|---|---|---|---|
| 6,941,384 B1 | 9/2005 | Aiken, Jr. et al. | |
| 7,146,432 B2 | 12/2006 | Antes et al. | |
| 2002/0095496 A1 | 7/2002 | Antes et al. | |
| 2003/0018813 A1 | 1/2003 | Antes et al. | |
| 2004/0158575 A1* | 8/2004 | Jacquemot et al. | 707/102 |
| 2005/0008001 A1* | 1/2005 | Williams et al. | 370/352 |
| 2006/0013228 A1* | 1/2006 | Malloy et al. | 370/394 |
| 2008/0183854 A1 | 7/2008 | Hopen et al. | |
| 2011/0007665 A1* | 1/2011 | Dinur | 370/254 |

* cited by examiner

*Primary Examiner* — Michael Y Won
(74) *Attorney, Agent, or Firm* — Yee & Associates, P.C.; Parashos T. Kalaitzis (57) ABSTRACT

A method for managing communications for a group of servers is disclosed. A processor sends requests to the group of servers for connection information for generating a set of mappings for a load balancer of the group of servers to replace another set of mappings for another load balancer of the group of servers. Responsive to receiving a communication from a client device for the group of servers, the processor determines whether a route to a server in the group of servers can be identified from the set of mappings for the load balancer. If the route cannot be identified from the set of mappings for the load balancer, the processor forwards the communication to a sub-group of the group of servers that have not yet responded to the requests for connection information for generating the set of mapping so that only the one correct server responds.

20 Claims, 4 Drawing Sheets

MANAGING CONNECTION FAILOVER IN A LOAD BALANCER

BACKGROUND OF THE INVENTION

1. Field of the Invention

The disclosure relates generally to an improved data processing system, and, in particular, to a method and apparatus for processing communications. Still more particularly the present disclosure relates to a method and apparatus for managing connection failover in a load balancer.

2. Description of the Related Art

The Internet is a system of interconnected public and private computer networks. Computing devices communicate with each other over the Internet using a number of Internet protocols. These Internet protocols identify the computing devices and other resources on the Internet using Internet Protocol (IP) addresses and port numbers. Some Internet protocols, such as Transmission Control Protocol/Internet Protocol (TCP/IP), require the establishment of a connection for the communications. For example, after establishing a connection to a resource for a computing device, the computing device may then send requests for information from the resource, send information to the resource, and send a command terminating the connection with the resource. One valuable feature of Internet protocols is that a failure of an intermediate portion of a network will not prevent communications from getting to their destination, as long as there is an alternate path through the network.

In some computing environments, use of a resource is distributed across a group of computing devices by a load balancer. Load balancers manage communications between clients and resources. For example, when a client computer sends a request to establish a connection with a resource, a load balancer may intercept the connection. In this example, the load balancer, which is not an endpoint in the connection, responds to the connection request by selecting a particular computing device in a group of computing devices to handle the connection. In this example, the load balancer stores these connections to device mappings in a table that is used by the load balancer to route subsequent communications between client computers and the group of computing devices.

Situations may arise where a load balancer has to take over for another load balancer. For example, a planned outage or an unplanned outage of what was a previously active load balancer of a group of resources may result in the start of a process for an alternate load balancer taking over for the previously active load balancer. As with the previous load balancer, the alternate load balancer also needs a mapping table to route communications. The mapping tables of different load balancers are typically located in different data processing systems. If a resource or load balancer receives a communication for a connection that it does not have knowledge of, the typical behavior is to reply to the communication with a connection reset or to discard that communication. The connection reset tells the sender of the communication that the receiver does not know how to handle the communication and the connection should be aborted. Sending a connection reset exposes the situation to the sender of the communication. Exposing the situation is un-desirable in many computing environments.

Therefore, a process is needed for synchronizing the mapping tables of the active and alternate load balancers. One solution is to actively synchronize changes between the mapping tables. However, actively synchronizing mapping table changes while the load balancers are processing communications can result in unsatisfactory results. For example, for short lived connections it would be un-desirable to delay creation of connections made by an active load balancer until the connections have been replicated to an alternate load balancer. Similarly, it is also undesirable to process communications while mapping tables are incomplete or out of date due to delayed synchronization of mapping table changes.

Therefore, it would be desirable to have a method, apparatus, and computer program product that takes into account at least some of the issues discussed above.

SUMMARY

In one illustrative embodiment, a method, apparatus, and computer program product for managing communications for a group of servers is disclosed. An apparatus sends to each server in the group of servers a request for connection information for generating a set of mappings for a load balancer of the group of servers to replace another set of mappings for another load balancer of the group of servers. Responsive to receiving a communication from a client device for the group of servers, the apparatus determines whether a route to a server in the group of servers for the communication received from the client device can be identified from the set of mappings for the load balancer and if not, identifies a sub-group of servers in the group of servers that have not yet responded to the request for connection information. The apparatus then forwards the communication to the sub-group of servers in response to a determination that the route to the server in the group of servers for the communication received from the client device cannot be identified from the set of mappings.

DETAILED DESCRIPTION OF THE PREFERRED EMBODIMENT

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on remote computers, or entirely on the remote computers. In the latter scenario, the remote computers may be connected to the user's computer through any type of network, including a local area network (LAN) or a wide area network (WAN), or the connection may be made to an external computer (for example, through the Internet using an Internet Service Provider). Further in this latter scenario, the remote computers may include load balancers and servers in a load balancing environment. For example, the load balancers may be network appliances and other types of data processing systems that distribute connections among a group of servers of the load balancing environment.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The different illustrative embodiments provide a method, apparatus, and computer program product for managing communications for a group of servers. For example, the different illustrative embodiments may use a process for managing communications for a group of servers over a number of load balancers. For example, a connection failover system may send to each server in the group of servers a request for connection information for generating a set of mappings for a load balancer of the group of servers to replace another set of mappings for another load balancer of the group of servers. Responsive to receiving a communication from a client device for the group of servers, the connection failover system may determine whether a route to a server in the group of servers for the communication received from the client device can be identified from the set of mappings for the load balancer and if not, identifies a sub-group of servers in the group of servers that have not yet responded to the request for connection information. The connection failover system then forwards the communication to the sub-group of servers in response to a determination that the route to the server in the group of servers for the communication received from the client device cannot be identified from the set of mappings.

Figure 1:
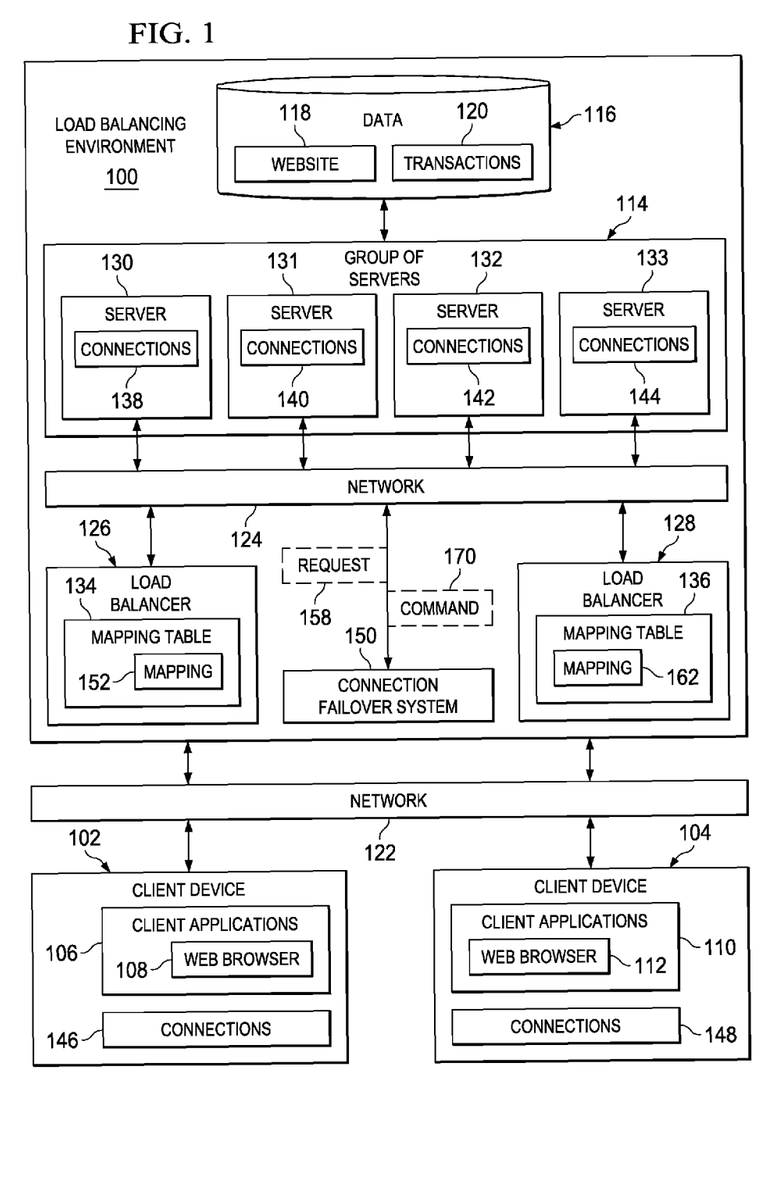
FIG. 1 is a block diagram of a load balancing environment for managing communications for a group of servers in accordance with an illustrative embodiment.

With reference now to the figures and, in particular, with reference to FIG. 1, a block diagram of a load balancing environment for managing communications for a group of servers is depicted in accordance with an illustrative embodiment. In this illustrative example, load balancing environment 100 is depicted in block diagram form.

As depicted, client applications, such as client applications 106 and client applications 110, run on computing devices, such as client device 102 and client device 104. As also depicted, client applications may include web browsers, such as web browser 108 and web browser 112, and any other client applications that access group of servers 114 in load balancing environment 100. Client applications access group of servers 114 to create, update, delete, and browse data 116. In these illustrative examples, data 116 may be a database, memory, a repository, a data processing system, and any other suitable resource for storing, retrieving, updating, and deleting data. For example, data 116 may include websites, such as website 118. In this example, web browser 108 of client device 102 and web browser 112 of client device 104 may retrieve website 118 from group of servers 114. As another example, transactions 120 may include transactions managed by group of servers 114 in response to receiving communications from client applications 106 and client applications 110. For example, transactions 120 may be associated with user input received by web browsers for website 118.

As used herein, a "resource" is one of a computing device, a service hosted by a computing device, and any other suitable type of resource in load balancing environment 100. As used herein, "a group of," when used with reference to items, means one or more items. As used herein, "a subgroup of," when used with reference to a group of items, means one or more items of the group of items. As used herein, "a set of," when used with reference to items, means one or more items. As used herein, "a subset of," when used with reference to a set of items, means one or more items of the set of items.

In these illustrative examples, client applications running in client devices communicate with group of servers 114 over network 122. As depicted, access to servers in group of servers 114 is distributed by load balancers, such as load balancer 126 and load balancer 128, in load balancing environment 100. As also depicted, the load balancers in load balancing environment 110 communicate with group of servers 114 over network 124. Network 122 and network 124 are examples of public and private networks over which Internet Protocols are used. For example, network 122 may be the Internet network and any combination of public and private networks for communicating with load balancing environment 100. In this example, network 124 may be any suitable public or private network for a group of servers managed by load balancers in load balancing environment 100.

As depicted, load balancer 126 and load balancer 128 manage communications between client devices and servers in group of servers 114, such as server 130, server 131, server 132, server 133, and any number of other servers in group of servers 114. For example, responsive to client device 102 sending a request to establish a connection with a resource managed by load balancing environment 100, load balancer 126 intercepts the request. In this example, load balancer 126 responds to the connection request by selecting a particular server in group of servers 114 based on rules for distributing requests to servers in group of servers 114. In this example, load balancer 126 selects server 130 to handle communications for the resource requested. Load balancer 126 stores mappings in mapping table 134, such as mapping 152 of a connection from connections 146 to the selected server 130. As depicted, server 130 stores connections established with server 130 in connections 138, server 131 stores connections established with server 131 in connections 140, server 132 stores connections established with server 132 in connections 142, and server 133 stores connections established with server 133 in connections 144. As also depicted, client device 102 stores connections established with client device 102 in connections 146 and client device 104 stores connections established with client device 104 in connections 148. In these illustrative examples, load balancer 126 uses mapping table 134 to forward communications between client devices and servers in group of servers 114, and load balancer 128 uses mapping table 136 to forward communications between client devices and servers in group of servers 114.

As used herein, a "connection" is a connection for a networking protocol such as an Internet protocol. For example, a connection may be for a particular protocol for communicating with a particular resource by using an internet protocol (IP) address and port number for the resource. The load balancer is aware of the distinguishing characteristics of each connection it distributes, but is not an endpoint of the connection. The connection itself extends from a client device to one and only one server. For example, a connection in connections 146 extends from client device 102 through network 122, through load balancer 126, through network 124, to one and only one server in group of servers 114. In this example, client application 106 sends a request to load balancing environment 100, and if load balancer 126 selects server 130, then the same connection appears in connections 138 and in connections 146. In this example, mapping table 134 stores a description of the connection and that the connection was distributed to server 130.

In these illustrative examples, load balancing environment 100 includes connection failover system 150. Responsive to a planned or an unplanned outage of load balancer 126, connection failover system 150 begins a process for managing communications for group of servers 114 while replacing mapping table 134 of load balancer 126. For example, the process for managing communications for group of servers 114 while replacing mapping table 134 of load balancer 126 may include load balancer 128 taking over for load balancer 126. In this example, at the beginning of the process mapping table 136 does not have the same mappings as mapping table 134. In this example, mapping 152 is an example of a mapping between client device 102 and server 130. Mappings, such as mapping 152, comprise connection information, such as a client internet protocol address and port number and a server internet protocol address and port number. Still further in this example, connection failover system 150 sends request 158 to each server in group of servers 114 as a request for connection information for generating a mapping table for a load balancer of group of servers 114 to replace mapping table 134.

In these illustrative examples, when one of the servers in group of servers 114 receives request 158, the server responds by sending a copy of the connections in the server to connection failover system 150. When connection failover system 150 receives the copies of the connections from the servers, connection failover system 150 uses the copies to generate a new mapping table, such as mapping table 136. For example, connection failover system 150 may use a copy of the connections received from server 130 to recreate the mappings in mapping table 134, such as by replacing mapping 152 with mapping 162 in mapping table 136 in load balancer 128.

As depicted, connection failover system 150 may also send command 170 to each server in group of servers 114 as a command to suppress or resume sending connection reset messages when a message is received for an unknown connection. For example, connection failover system 150 may send command 170 to each server in group of servers 114 as a command to suppress sending connection reset messages when messages are received for unknown connections at the same time as request 158 is sent. In this example, subsequent to receiving responses from each server in group of servers 114 for request 158, connection failover system 150 may send another command to each server in group of servers 114 as a command to resume sending connection reset messages when messages are received for unknown connections.

The illustration of load balancing environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional load balancers in addition to load balancer 126 and load balancer 128 may be present within domain name services management environment 100. Also, although connection failover system 150 is shown as a separate block in load balancing environment 100, all or a portion of connection failover system 150 may also be implemented in any or all of the load balancers and servers in load balancing environment 100. In these illustrative examples, connection failover system 150 may be implemented by any combination of hardware and software products, and may also be implemented in one or more computer systems of a cluster of computer systems.

Figure 2:
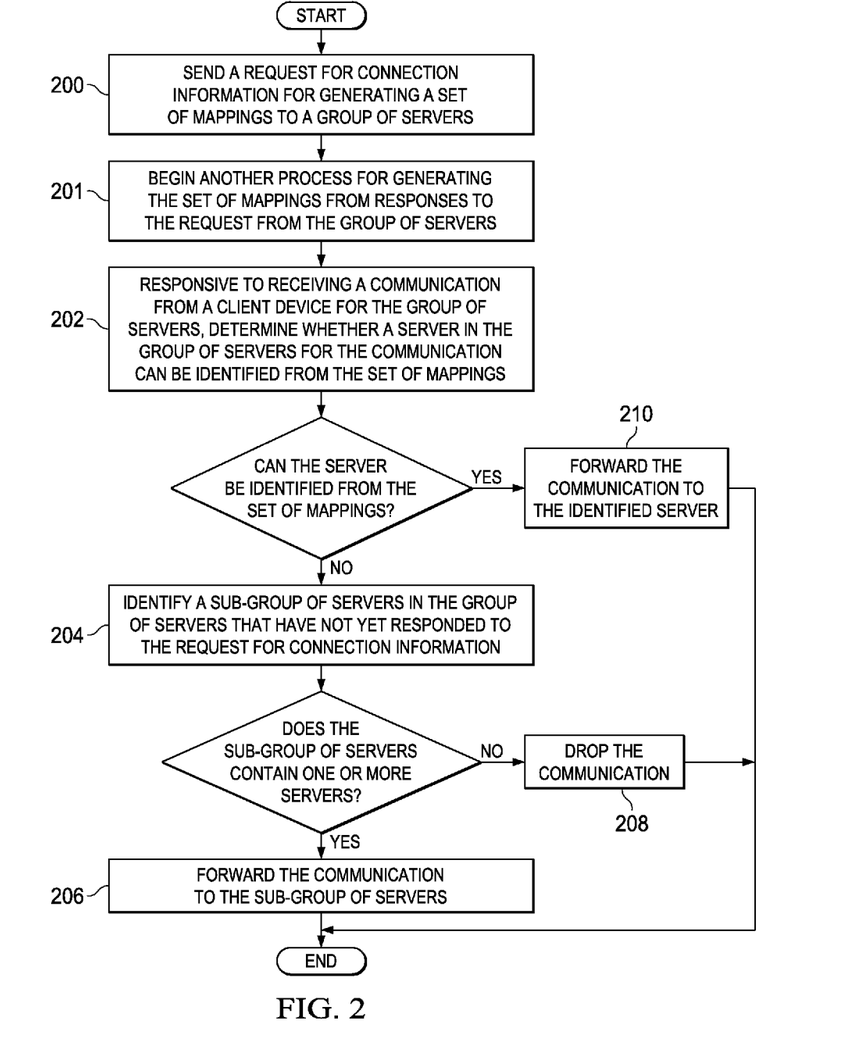
FIG. 2 is a flow chart of a process for managing communications for a group of servers in accordance with an illustrative embodiment.

Turning now to FIG. 2, an illustrative example of a flowchart of a process for managing communications for a group of servers is depicted in accordance with an illustrative embodiment. The steps in the process may be implemented in software, hardware, or a combination of the two by connection failover system 150 in load balancing environment 100 in FIG. 1.

The process begins by sending a request for connection information for generating a set of mappings to a group of servers (step 200). In this illustrated process, the request is an example of request 158 in FIG. 1, the set of mappings is an example of mapping table 136 in FIG. 1, and the group of servers is an example of group of servers 114 in FIG. 1.

The process begins another process for generating the set of mappings from responses to the request from the group of servers (step 201). Responsive to receiving a communication from a client device for the group of servers, the process determines whether a server in the group of servers for the communication can be identified from the set of mappings (step 202).

As depicted, if the server has been identified from the set of mappings, the process forwards the communication to the identified server (step 210) with the process terminating thereafter. If the server cannot be identified from the set of mappings, the process next identifies a sub-group of servers in the group of servers that have not yet responded to the request for connection information (step 204). As illustrated, if the sub-group of servers contains one or more servers, the process forwards the communication to the sub-group of servers (step 206) with the process terminating thereafter. If the sub-group of servers does not contain one or more servers, the process drops the communication (step 208) with the process terminating thereafter. In the illustrative examples, a mapping for a communication is identified in a mapping table by identifying a mapping in the mapping table that has the same source and destination, such as client and server, for the communication.

The illustrative embodiments recognize and take into account that existing network protocols such as Transmission Control Protocol/Internet Protocol (TCP/IP), connections for communications between clients and resources. For example, after a client computing device establishes a TCP/IP connection to a resource, the client computing device may then send requests for information from the resource, send information to the resource, send a command terminating the connection with the resource, and wait for a response. While waiting for a response, the information requested may be sent from the resource to the client. Additionally, a reset notification may be sent to the client from the resource and from any another data processing system functioning between the client and the resource, the reset notification informing the client that the connection should be terminated.

Figure 3:
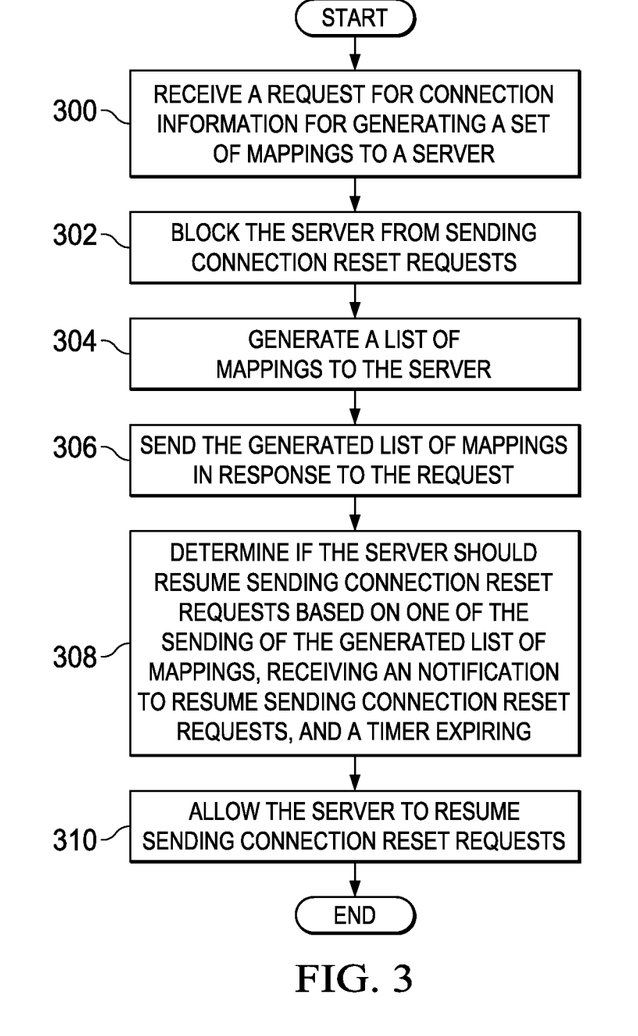
FIG. 3 is a flow chart of a process for managing communications for a group of servers while replacing a set of mappings of a load balancer of the group of servers in accordance with an illustrative embodiment.

Turning next to FIG. 3, an illustrative example of a flowchart of a process for managing communications for a group of servers while replacing a set of mappings of a load balancer of the group of servers is depicted in accordance with an illustrative embodiment. The steps in the process may be implemented in software, hardware, or a combination of the two by connection failover system 150 in load balancing environment 100 in FIG. 1.

The process begins by receiving a request for connection information for generating a set of mappings to a server (step 300). In this illustrated process, the request is an example of request 158 in FIG. 1, the set of mappings is an example of mapping table 136 of load balancer 128 in FIG. 1, and the server is an example of one of group of servers 114 in FIG. 1.

Responsive to receiving the request, the process blocks the server from sending connection reset notifications (step 302). As depicted, the process generates a list of mappings to the server based on connection information from prior connections made between clients and the server (step 304). The process sends the list of mappings in response to the request (step 306).

The process determines if the server should resume sending connection reset notifications based on one of the sending of the generated list of mappings, receiving notification to resume sending connection reset notifications, and a timer expiring (step 306), and if so, the process then allows the server to resume sending connection reset notifications (step 308) with the process terminating thereafter.

Figure 4:
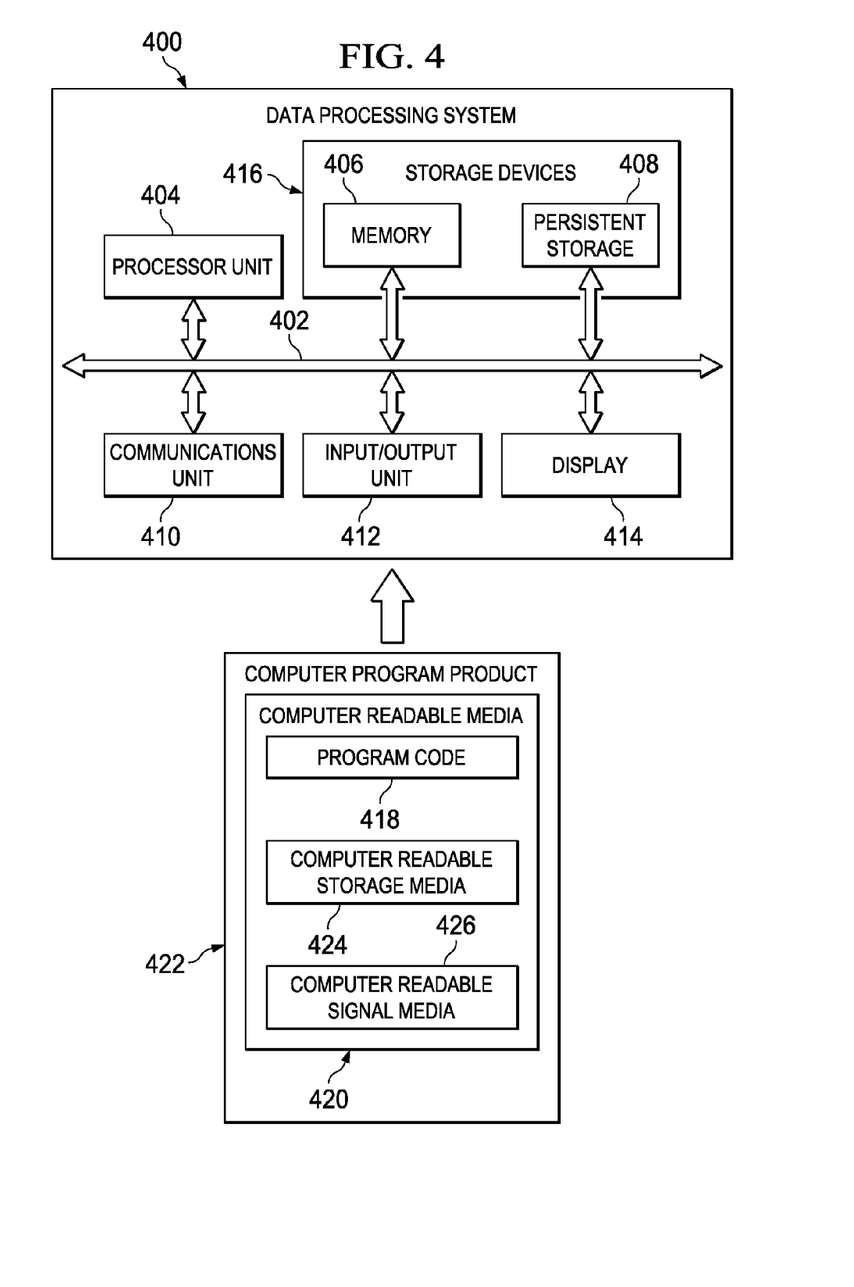
FIG. 4 is an illustration of a data processing system in accordance with an illustrative embodiment.

Turning now to FIG. 4, an illustration of a data processing system is depicted in accordance with an illustrative embodiment. Data processing system 400 is an example of a data processing system that may be used to managing communications for a group of servers in a connection failover system. Data processing system 400 is also an example of a data processing system that may be used to implement client device 102, client device 104, data 116, load balancer 126, load balancer 128, server 130, server 131, server 132, and server 133 in FIG. 1. More particularly, data processing system 400 may be used to implement connection failover system 150 in FIG. 1. In this illustrative example, data processing system 400 includes communications framework 402, which provides communications between processor unit 404, memory 406, persistent storage 408, communications unit 410, input/output (I/O) unit 412, and display 414. In these examples, communications frame work 402 may be a bus system.

Processor unit 404 serves to execute instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications framework 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426. Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400. In these examples, computer readable storage media 424 is a physical or tangible storage device used to store program code 418 rather than a medium that propagates or transmits program code 418. Computer readable storage media 424 is also referred to as a computer readable tangible storage device or a computer readable physical storage device. In other words, computer readable storage media 424 is a media that can be touched by a person.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations. For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 418 may be omitted because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

In another example, a bus system may be used to implement communications framework 402 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 406, or a cache, such as found in an interface and memory controller hub that may be present in communications framework 402.

Thus, the illustrative embodiments provide a method, apparatus, and computer program product for managing communications for a group of servers. In one example, a program runs in a computer system and manages communications for a group of servers over a number of load balancers. In this example, the program sends to each server in the group of servers a request for connection information for generating a set of mappings for a load balancer of the group of servers to replace another set of mappings for another load balancer of the group of servers. Responsive to receiving a communication from a client device for the group of servers, the program determines whether a route to a server in the group of servers for the communication received from the client device can be identified from the set of mappings for the load balancer and if not, identifies a sub-group of servers in the group of servers that have not yet responded to the request for connection information. The program forwards the communication to the sub-group of servers in response to a determination that the route to the server in the group of servers for the communication received from the client device cannot be identified from the set of mappings. For example, these steps may be responsive to a need to replace the other set of mappings for the other load balancer of the group of servers. The need to replace the load balancer may be a scheduled outage or an unscheduled outage, such as due to a failure associated with the other load balancer. In this and other examples, the program may suppress connection reset messages that would otherwise be sent to the client device until the set of mappings for the load balancer has been generated from responses to the requests. For example, the program may send commands to the group of servers or the sub-group of servers to suppress sending connection reset notifications until the set of mappings has been generated.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing communications for a group of servers, the method comprising:
    sending, by one or more processors, to each server in the group of servers a request for connection information for generating a set of mappings for a load balancer of the group of servers to replace another set of mappings for another load balancer of the group of servers;
    responsive to receiving a communication from a client device for the group of servers, determining, by one or more processors, whether a route to a server in the group of servers for the communication received from the client device can be identified from the set of mappings for the load balancer and if not, identifying, by one or more processors, a sub-group of servers in the group of servers that have not yet responded to the request for connection information; and
    responsive to a determination that the route to the server in the group of servers for the communication received from the client device cannot be identified from the set of mappings while the sub-group of servers includes one or more servers that have not yet responded to the request for connection information, forwarding, by one or more processors, the communication to the sub-group of servers.

2. The method of claim 1, wherein the step of forwarding, by one or more processors, the communication to the sub-group of servers comprises suppressing a connection reset message that would otherwise would be sent to the client by the load balancer.

3. The method of claim 1, wherein the step of sending, by one or more processors, to each server in the group of servers the request for connection information for generating the set of mappings for the load balancer of the group of servers to replace the other set of mappings for the other load balancer of the group of servers, is responsive to receiving notification that the load balancer is replacing the other load balancer.

4. The method of claim 1, wherein the step of sending, by one or more processors, to each server in the group of servers the request for connection information for generating the set of mappings for the load balancer of the group of servers to replace the other set of mappings for the other load balancer of the group of servers comprises sending the request to each server in parallel.

5. The method of claim 2, wherein the step of forwarding, by one or more processors, the communication to the sub-group of servers comprises sending commands to the sub-group of servers to suppress connection reset messages for communications until a determination, by one or more processors, that the sub-group of servers in the group of servers that have not yet responded to the request for connection information is empty.

6. The method of claim 2, wherein the step of forwarding, by one or more processors, the communication to the sub-group of servers forwards the communication to all of the servers in the group of servers and suppresses all connection reset messages associated with the communication that would otherwise be sent to the client device from the load balancer and the group of servers.

7. The method of claim 1, wherein the communication from the client device is for a previously established connection for a networking protocol to the group of servers managed by the other load balancer.

8. The method of claim 7, wherein the networking protocol is one of Transmission Control Protocol and User Datagram Protocol.

9. The method of claim 1, wherein the load balancer is a network appliance.

10. An apparatus for managing communications for a group of servers, the apparatus comprising:
one or more processor units;
first program code to send to each server in the group of servers a request for connection information for generating a set of mappings for a load balancer of the group of servers to replace another set of mappings for another load balancer of the group of servers;
second program code responsive to receiving a communication from a client device for the group of servers to determine whether a route to a server in the group of servers for the communication received from the client device can be identified from the set of mappings for the load balancer and if not, identify a sub-group of servers in the group of servers that have not yet responded to the request for connection information; and
third program code responsive to a determination that the route to the server in the group of servers for the communication received from the client device cannot be identified from the set of mappings while the sub-group of servers includes one or more servers that have not yet responded to the request for connection information to forward the communication to the sub-group of servers, wherein the first program code, the second program code, and the third program code are stored in at least one of the one or more memories of the device for execution by at least one of the one or more processor units via at least one of the one or more memories of the device.

11. The apparatus of claim 10, wherein the third program code to forward the communication to the sub-group of servers comprises program code to suppress a connection reset message that would otherwise would be sent to the client by the load balancer.

12. The apparatus of claim 10, wherein the first program code to send to each server in the group of servers the request for connection information for generating the set of mappings for the load balancer of the group of servers to replace the other set of mappings for the other load balancer of the group of servers, is responsive to program code in the first program receiving notification that the load balancer is replacing the other load balancer.

13. The apparatus of claim 10, wherein the first program code to send to each server in the group of servers the request for connection information for generating the set of mappings for the load balancer of the group of servers to replace the other set of mappings for the other load balancer of the group of servers comprises program code to send the request to each server in parallel.

14. The apparatus of claim 11, wherein the third program code to forward the communication to the sub-group of servers comprises program code to send commands to the sub-group of servers to suppress connection reset messages for communications until additional program code in the third program code determines that the sub-group of servers in the group of servers that have not yet responded to the request for connection information is empty.

15. The apparatus of claim 11, wherein the third program code to forward the communication to the sub-group of servers also comprises program code to forward the communication to all of the servers in the group of servers and suppress all connection reset messages associated with the communication that would otherwise be sent to the client device from the load balancer and the group of servers.

16. The apparatus of claim 10, wherein the communication from the client device is for a previously established connection for a networking protocol to the group of servers managed by the other load balancer.

17. The apparatus of claim 16, wherein the networking protocol is one of Transmission Control Protocol and User Datagram Protocol.

18. The apparatus of claim 10, wherein the load balancer is a network appliance.

19. A computer program product for managing communications for a group of servers, the computer program product comprising program instructions stored on a computer readable storage device, for:
sending to each server in the group of servers a request for connection information for generating a set of mappings for a load balancer of the group of servers to replace another set of mappings for another load balancer of the group of servers;
determining whether a route to a server in the group of servers for a communication received from a client device can be identified from the set of mappings for the load balancer and if not, identifying, by one or more processors, a sub-group of servers in the group of servers that have not yet responded to the request for connection information; and
forwarding the communication to the sub-group of servers in response to a determination that the route to the server in the group of servers for the communication received from the client device cannot be identified from the set of mappings while the sub-group of servers includes one or more servers that have not yet responded to the request for connection information.

20. The computer program product of claim 19 wherein the communication from the client device is for a previously established connection for a networking protocol to the group of servers managed by the other load balancer, the networking protocol is one of Transmission Control Protocol and User Datagram Protocol, and the load balancer is a network appliance, and
wherein the program instructions stored on the computer readable storage device, for forwarding the communication to the sub-group of servers comprises program instructions for suppressing a connection reset message that would otherwise would be sent to the client by the networking appliance.

\* \* \* \* \*